United States Patent [19]

Olshefsky

[11] Patent Number: 5,063,687

[45] Date of Patent: Nov. 12, 1991

[54] ADJUSTABLE MEASURING PARALLELS

[75] Inventor: Frank A. Olshefsky, Schenectady, N.Y.

[73] Assignee: Equipment Development Services, Schenectady, N.Y.

[21] Appl. No.: 588,817

[22] Filed: Sep. 27, 1990

[51] Int. Cl.$^5$ .......................... G01B 5/14; G01B 7/14
[52] U.S. Cl. ...................................... 33/827; 33/542; 33/783
[58] Field of Search .............. 33/827, 821, 542, 544.4, 33/794, 795, 796, 802, 783–785, 787, 789, 813, 819, 823, 824, 542.1, 501.08, 501.09, 804, 806, 811

[56] References Cited

U.S. PATENT DOCUMENTS

| | | | |
|---|---|---|---|
| 212,288 | 2/1879 | Vassar | 33/802 |
| 1,496,199 | 6/1924 | Bath | 33/501.08 |
| 1,577,099 | 3/1926 | Bath | 33/542 |
| 2,581,473 | 1/1952 | Eisele | 33/542.1 |
| 2,663,942 | 12/1953 | Rudolph . | |
| 2,679,107 | 5/1954 | Gondek . | |
| 2,822,622 | 2/1958 | Meyer | 33/542 |
| 2,830,375 | 4/1958 | Zwayer . | |
| 3,186,093 | 6/1965 | Binder . | |
| 3,406,457 | 10/1968 | Poulin | 33/802 |
| 3,924,336 | 12/1975 | Inoue . | |
| 3,995,374 | 12/1976 | Fisk | 33/802 |
| 4,008,523 | 2/1977 | von Voros . | |
| 4,255,861 | 3/1981 | Nakata et al. . | |
| 4,419,829 | 12/1983 | Miller | 33/501.08 |
| 4,447,960 | 5/1984 | Golinelli et al. | 33/783 |
| 4,885,845 | 12/1989 | Yamamoto et al. | 33/827 |
| 4,926,559 | 5/1990 | Knäbel | 33/832 |

Primary Examiner—William A. Cuchlinski, Jr.
Assistant Examiner—C. W. Fulton
Attorney, Agent, or Firm—Pollock, Vande Sande & Priddy

[57] ABSTRACT

The adjustable measuring parallel has a head assembly that includes upper and lower slider blocks that are mated to each other at an incline, which may be a common transversal incline. The upper slider block is connected to a movable extender rod member which has connected to its other end a ferromagnetic core. The lower slider block is connected to a stationary extender member which is threaded to a handle that has a cavity in which a linear variable differential transformer (LVDT) is fitted. By moving the movable extender member in directions along the longitudinal axis of the instrument, the upper slider block is forced against the lower slider block such that relative movements are effected between the two slider blocks along a direction orthogonal to the parallel surfaces of the slider blocks, or the longitudinal axis of the tool. As the movable extender member moves longitudinally, the ferromagnetic core connected to its end likewise traverses through the aperture of the LVDT, thereby generating an induced EMF which is converted by the LVDT to a DC voltage that is indicative of the distance of the relative movement between the parallel surfaces of the slider blocks. Instead of using electronics to convert the relative orthogonal movements of the slider blocks to a reading, mechanical indicators such as a dial indicator may also be used.

18 Claims, 9 Drawing Sheets

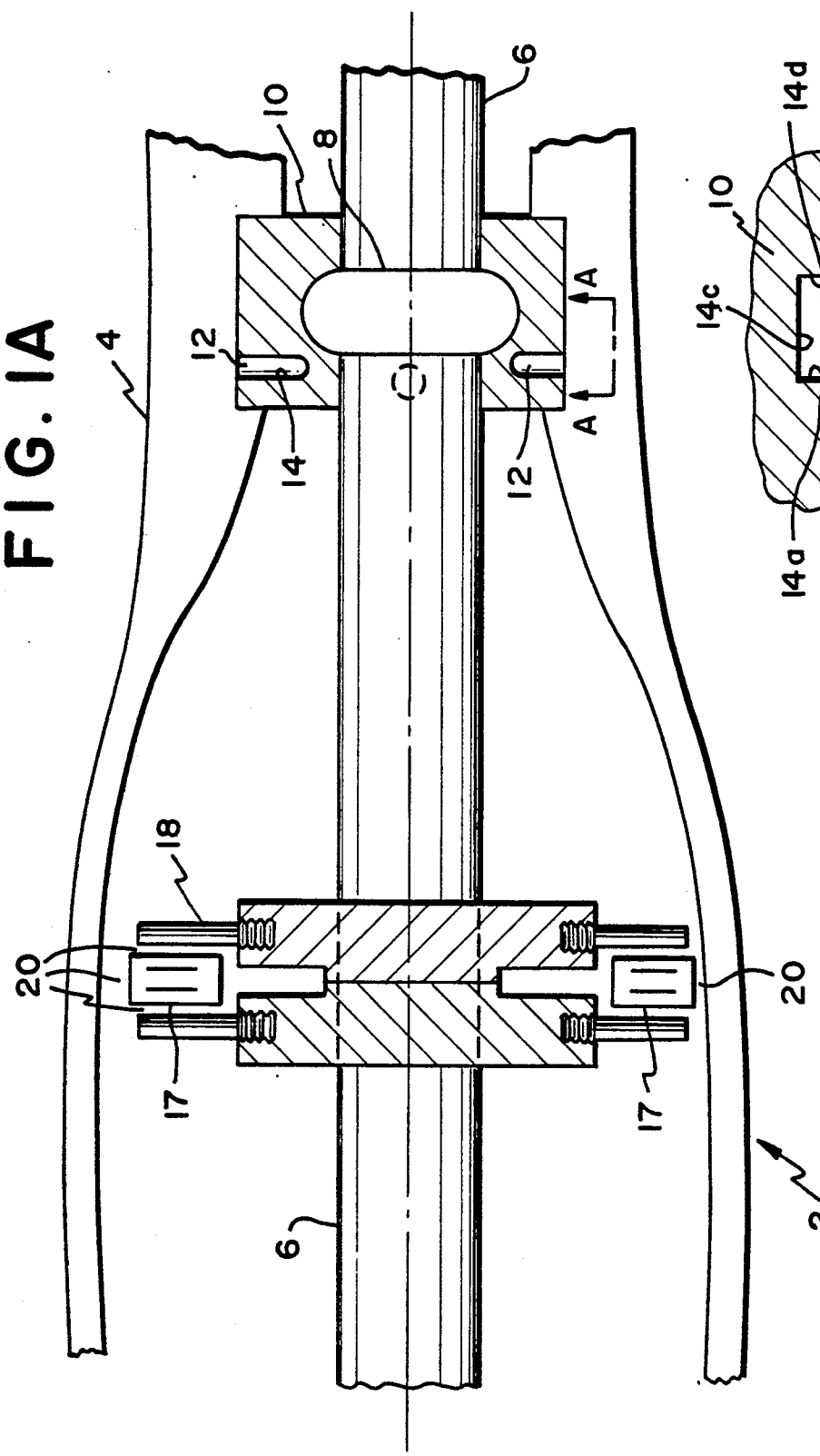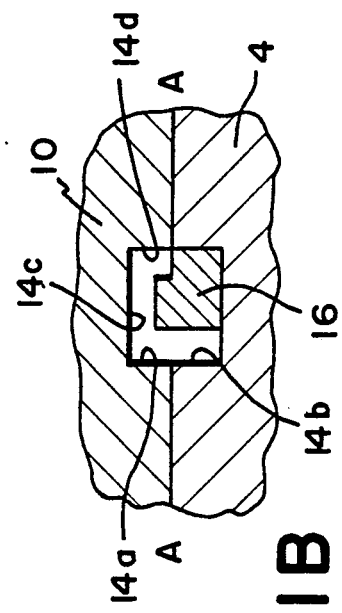

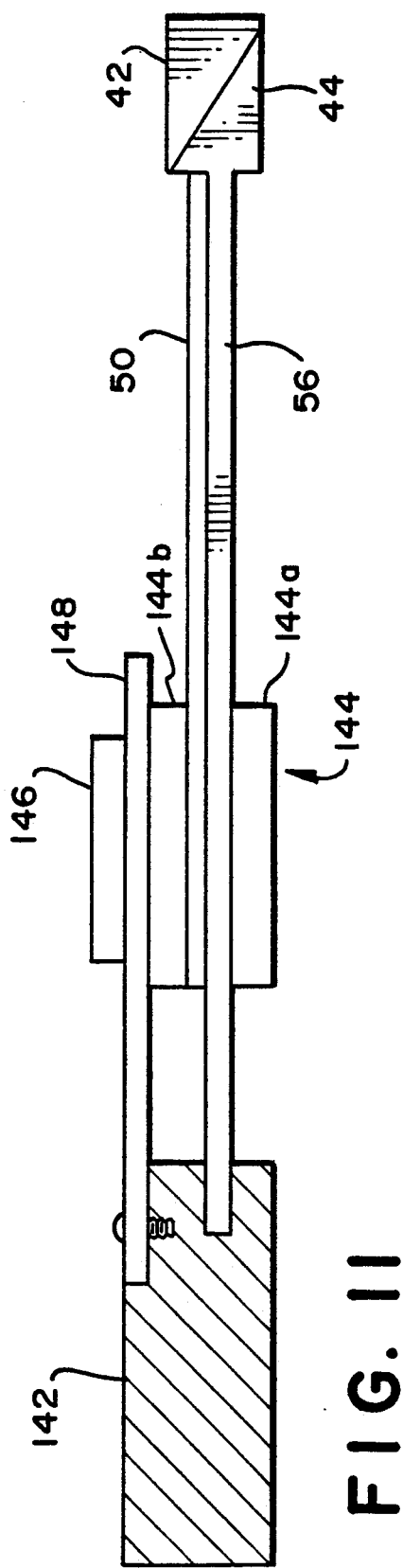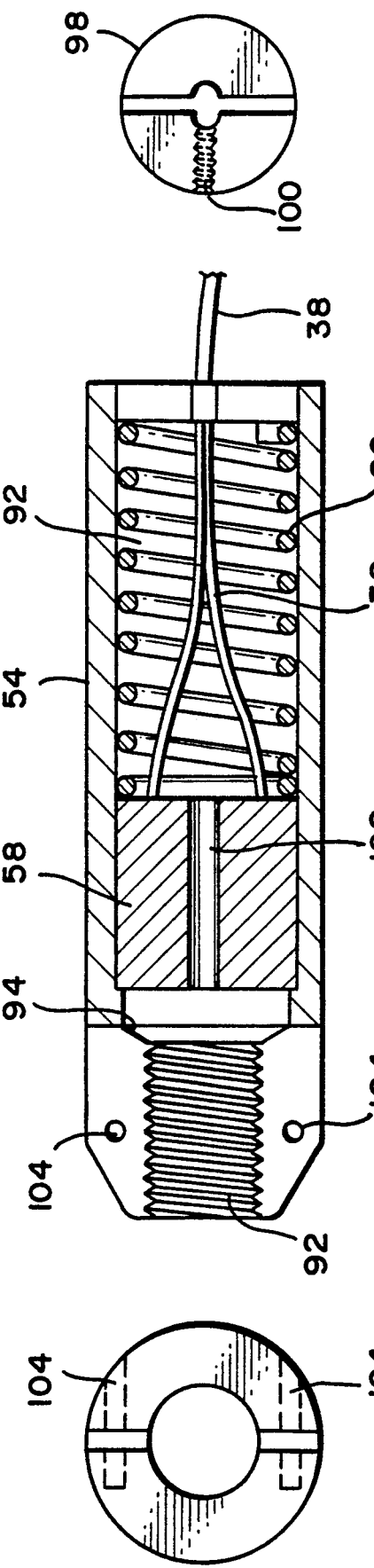

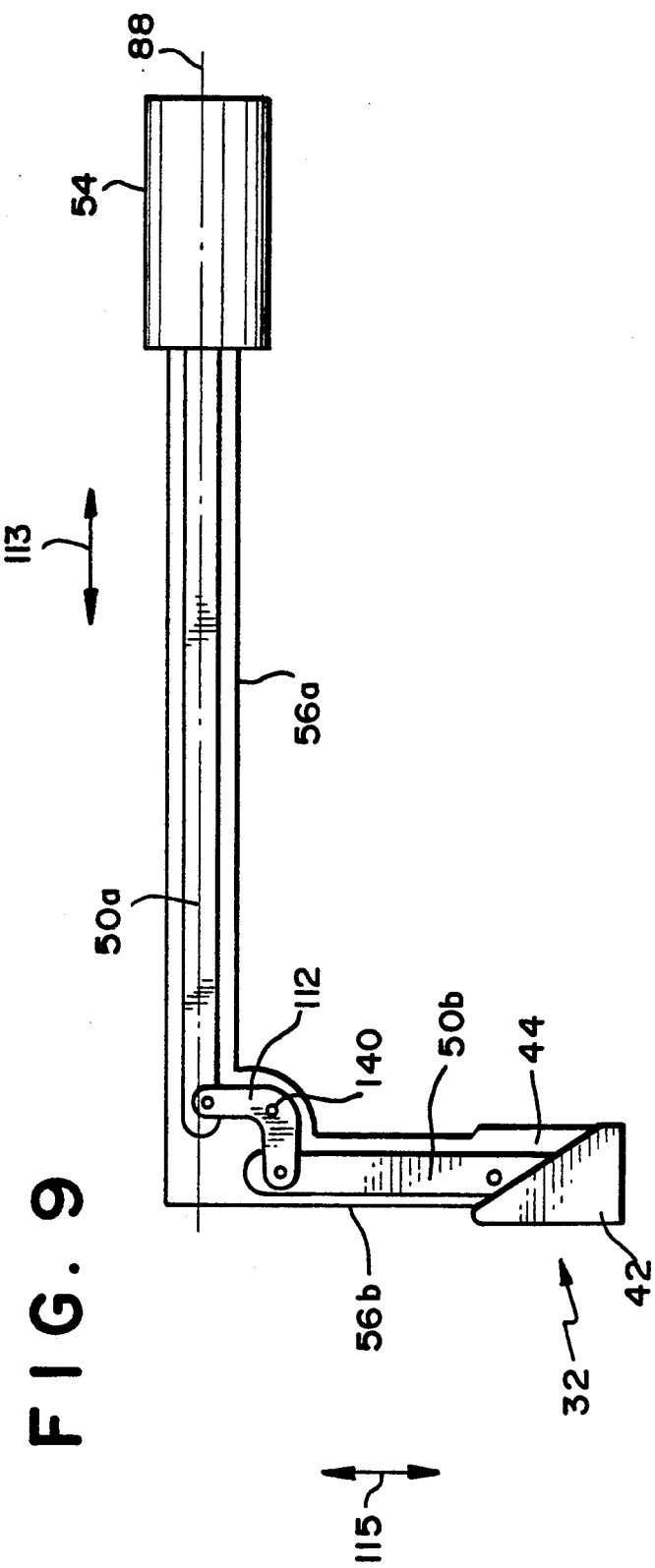
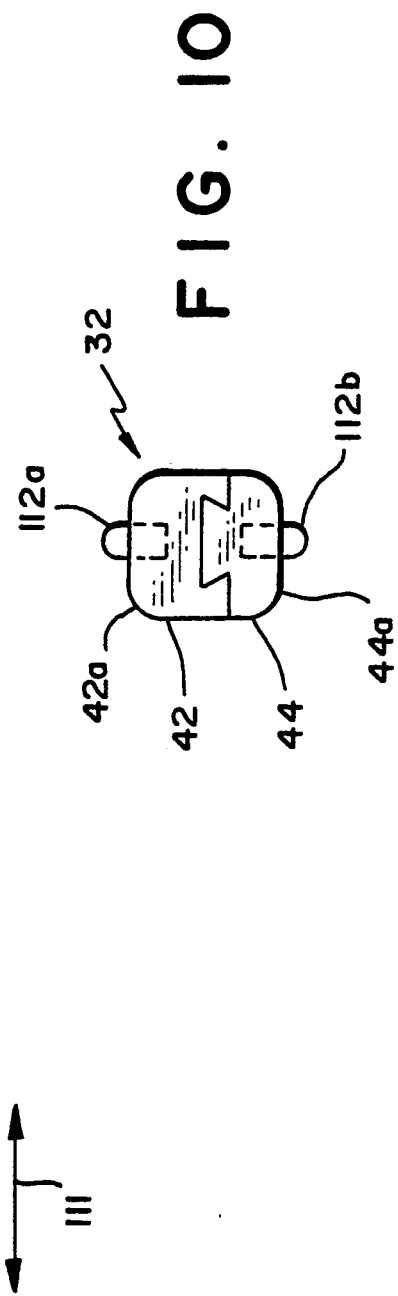
FIG. 9
FIG. 10

ADJUSTABLE MEASURING PARALLELS

FIELD OF INVENTION

The present invention relates to measuring instruments and more particularly to an instrument that is specifically suited for measuring gap openings or diameters of holes that otherwise are not amenable to being measured by conventional micrometers or gauges.

BRIEF DESCRIPTION OF THE PRIOR ART

Prior to the instant invention, to measure a gap or the inside diameter of a bore, mechanical parallels or filler gauges are used. Examples of such are illustrated by the tools of Rudolph (U.S. Pat. No. 2,663,942) and Gondek (U.S. Pat. No. 2,679,107). In the case of '942 tool, a wedge is used to separate two measuring surfaces, as the shaft to which the wedge is integrated is turned, in conjunction with a micrometer. In the case of '107 tool, a ramping wedge is used to push opposed pins in a radial direction. Again, the turning of a micrometer screw causes the ramping wedge to radially affect its measurement pins.

With both of the '942 and '107 tools, the wedges have to have very accurately ground angles so that the translation of the wedge is synchronized with the rotation of the read-out mechanism, i.e., the graduated micrometer barrel. Naturally, by using a micrometer which demands minute and careful turning thereof, neither of the prior art tools allows for quick measurements to be taken. Nor could the measuring surfaces of either of the tools be forcibly retracted, as both tools rely on springs for retraction. Furthermore, if wear occurs in those prior art tools, unless the wear is uniform throughout the full travel of the sliding elements, errors would occur as the wear could not be compensated. So, too, to read the measurement, direct observation of the micrometer barrel is required. Also, due to the mechanical advantage of the screw, it is very easy to exert excessive force when taking readings, which contributes to measuring error. Thus, as exemplified by the '942 and '107 tools, there are a number of disadvantages inherent in prior art micrometers and filler gauges.

The above-noted disadvantages are magnified when deep gap openings or the diameters of deep holes, such as those associated with turbines as illustrated in FIGS. 1A, 1B and 2, are to be measured.

In particular, with reference to a typical turbine section 2 shown in FIG. 1A, there are a number of gaps or hole diameters which cannot be measured successfully by prior art tools as exemplified by the above discussed references. As shown, turbine 2 has a shell 4 which encompasses a shaft 6 resting on bearings 8 (only one of which is shown). Bearing 8 is set in a bearing standard whose clearance with shell 4 is set by a number of gib keys 12. Gib keys 12 fit into a stationary key way of the housing, as viewed in section A—A. In order to have a desirable bearing clearance, there has to be an almost perfect fit between key 12 and key way 14.

To achieve this end, with reference to FIG 1B, conventionally a dummy key 16 has to be first inserted into key way 14. After that a number of measurements, corresponding to the distance between dummy key 16 and surfaces 14a to 14b, are taken. By measuring the gaps between the different surfaces and the dummy key, a substantially perfect matching key is molded. Ordinarily, the holes into which the key fits is approximately 12 inches long. That being the case, it is quite apparent that the prior art tools, which are of modest lengths, cannot be used. Furthermore, a number of diaphragms 17, working in conjunction with buckets such as 18 in the turbine, have to have very precise gap clearances 20 from shell 4, in order to enhance the efficiency of the turbine. Again, such close tolerance and difficult gap measurements cannot easily be done with prior art measurement tools.

Another measurement, known as coupling alignment, that cannot easily be done with conventional gap measuring tools is illustrated in FIG. 2. As shown, a turbine has to be coupled to a generator by means of couplings 22a and 22b, whose alignment has to be very precise. For a precise alignment, measurements have to be taken at four equally distanced points at gap 24 between couplings 22a and 22b. After the four readings are taken, either shaft a of the turbine or shaft 6b of the generator is rotated 90 degrees, and another set of four equal distanced readings is taken. Only after a number of measurements, for example 16, are taken and averaged, and it is found that couplings 22a and 22b are in perfect alignment, then can the couplings be bolted. In view of the large diameter of the couplings and the accessibility problems due to close proximity of adjacent parts, prior art tools can only be used, if at all, with great difficulties.

BRIEF DESCRIPTION OF THE PRESENT INVENTION

Developed to specifically measure deep gap openings or bore diameters, the present invention adjustable measuring parallels comprises a head assembly that has opposed parallel surfaces which are movable relative to each other along a common incline, which may be a common transversal incline, a stationary extending rod member having one end connected to one of the parallel surfaces, a movable extender rod member having one end connected to the other of the parallel surfaces and another end connected to a ferromagnetic core whose translation or movement is measured by a linear variable differential transformer, fitted in a cavity of a handle which is threadedly mated with the stationary extender rod member. The linear variable differential transformer converts the translational movement of the ferromagnetic core into an electrical signal whose value corresponds to the translational movement of the core, which is moved only when the opposed parallel surfaces are moving relative to each other resulting in an orthogonal movement of the parallel surfaces.

Inasmuch as the rod members connecting the opposed parallel surfaces are much lengthier than those of the prior art tools, the present invention measuring parallels can easily work within deep gap openings or holes. Furthermore, since the translational movement of one of the rod members corresponds to the relative movement of the parallel surfaces, remote reading of the distance between the two opposed parallel surfaces, and therefore the distance between the surfaces being measured thereby, can be effected. Also, by changing the slope of the transversal incline, the accuracy of the tool can easily be magnified by a factor of 10 or more.

Furthermore, since the opposed parallel surfaces are mated along a common incline, the relative movement between the parallel surfaces is precisely controlled, by the movement of one of the rod members. Thus, quick measurements, whose accuracy can be further enhanced by electronics, can be taken.

It is therefore an objective of the present invention to provide a measuring instrument that is adaptable to be used to measure deep gap openings and hole diameters, beyond that of currently available instruments.

It is another objective of the present invention to provide a measuring instrument that is simple to use, does not depend on extraneous components and can be easily recalibrated even if it were to wear.

It is yet another objective of the present invention to provide an instrument that can quickly measure the distance between two surfaces, or the diameter of a hole, and provide a reading that is remote from the being measured surfaces or diameters.

It is yet a further objective of the present invention to provide a design that does not allow excessive force to be exerted on the measuring surfaces which would cause erroneous readings.

BRIEF DESCRIPTION OF THE DRAWINGS

The above mentioned objectives and advantages of the present invention will become more apparent and the invention itself will be best understood by reference to the following description of embodiments of the invention taken in conjunction with the accompanying drawings, wherein:

FIG. 1A is a partial sectional view of a turbine including gap openings and deep holes for which the present invention instrument is perfectly well adapted to be used;

FIG. 1B is a cross-sectional view along cut A—A of FIG. 1;

FIG. 5A is a cross-sectional view of the handle of the FIG. 3 instrument;

FIG. 5B is an end view of the FIG. 5A handle to which the FIGS. 4A and 4B members are joined;

FIG. 5C is an end view of the plug which seals the end of the FIG. 5A handle;

FIG. 9 is a second embodiment of the present invention illustrating an instrument that can measure gap openings or diameters of holes at right angle;

FIG. 10 is another illustration of construction of the head assembly that allows the present invention instrument to measure the diameter of a hole; and FIG. 11 is yet another embodiment of the present invention instrument utilizing a linear electronic scale.

DETAILED DESCRIPTION OF THE PRESENT INVENTION

Figure 3:
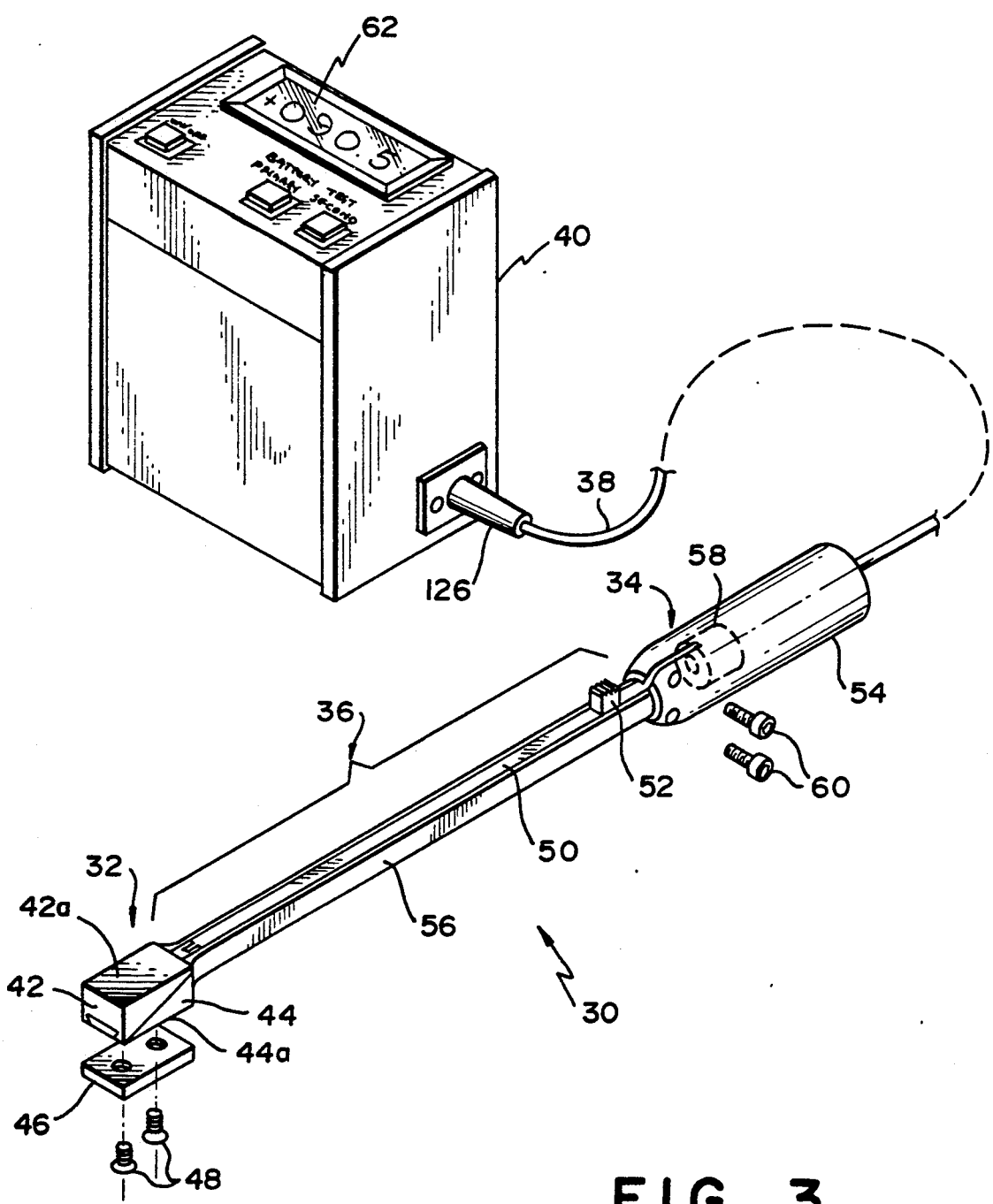
FIG. 3 is a perspective view of the different components of the present invention instrument.

With reference to FIG. 3, the present invention adjustable measurement parallels is shown to have a tool portion 30 comprising a head assembly 32, a measuring and converting portion 34 and a connecting part 36 which connects head assembly 32 to measuring portion 34. The output from portion 34 is shown to be connected, via a cable 38, to a container 40, in which the electronic circuit, on a printed circuit board, for providing a readable indication of the measurement effected by head assembly is mounted. Although an electronic output means is described, a mechanical output such as a conventional dial indicator could also be used.

Concentrating at tool 30, and more specifically at head assembly 32, there is shown an upper slider block 42 mated to a lower slider block 44. Although not limiting thereto, slider block 42 is mated to slider block 44 in a transversal dovetail construction, more clearly shown in FIG. 6B. An adder block 46 may be added to lower slider block 44 by screws 48 thereby increasing the measuring range. Slider blocks 42 and 44 have opposed parallel surfaces, designated 42a and 44a, respectively, which are used to effect the actual measurement of the distance between the to be measured surfaces, or the inner diameter of a hole, provided that the to be discussed protrusions are added. A more thorough discussion of the construction of the slider blocks and the adder block, and the functions thereof will follow.

Upper slider block 42 is shown to be connected to an extender rod member 50, which has a thumb projection 52, extending into a handle 54 of measuring section 34. Extender rod member 50 is loosely fitted in a slot in lower extender member 56. Lower slider block 44 is integrally connected to a lower extender member 56, which is mated to handle 54. Although not clearly shown in FIG. 3, handle 54 has a cavity inside of which a linear variable differential transformer 58 (LVDT) fittedly resides. There is also shown screws 60, whose function of tightening handle 54 to extender member 56 to provide calibration will be more fully described later.

Container 40 encloses the printed circuit board on which components of the circuit that provide the readout at 62 are mounted.

Figure 4A:
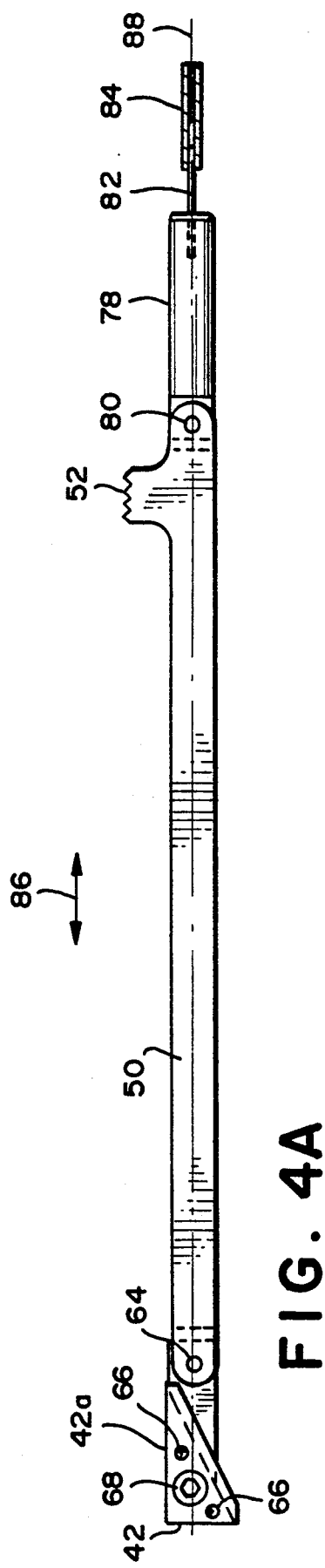
FIG. 4A is a side view of the movable extension member of the present invention instrument.
Figure 4B:
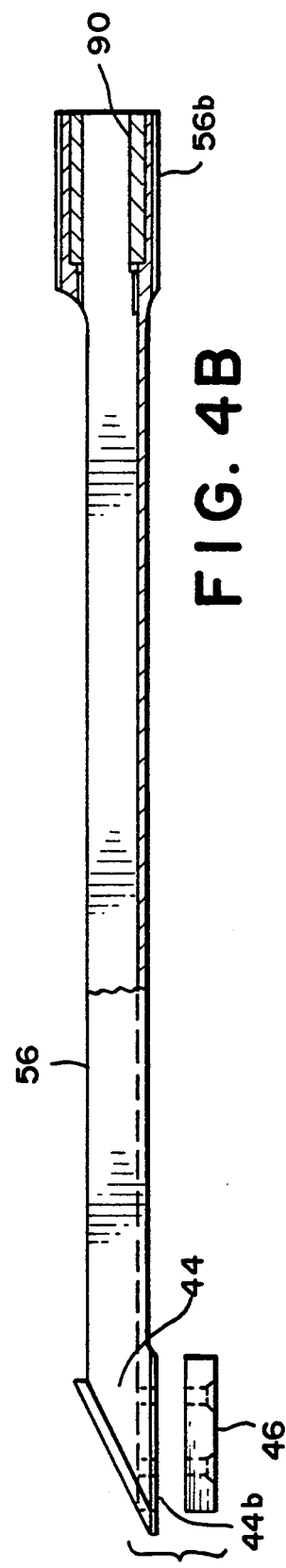
FIG. 4B is a side view of the stationary extending member of the present invention instrument.

A cross-sectional view of upper slider block 42 and extender rod member 50 is shown in FIG. 4A and a semi-cross-sectional side view of lower slider block 44 and its integral extender member 56 is shown in FIG. 4B. As shown, slider block 42 is connected to movable extender rod member 50 by a connecting pin 64. Slider block 42 itself, for this embodiment but not necessarily limiting thereto, is comprised of three sections, shown more clearly in FIG. 6B as 42b, 42c and 42d. To connect the three sections together, dowel pins 66 and an assembly screw 68 are used. It should be appreciated that slider block 42 may be a unitary piece, instead of the three pieces for ease of manufacturing.

The other end of movable extender member 50, to which thumb projection 52 is in proximity, is connected to a slider cylinder 78 by a connecting pin 80. At the end of slider cylinder 78 not connected to movable extender rod member 50 there is threadedly mated, by a threaded rod 82, a ferromagnetic LVDT core 84. As can easily be envisioned, any movement caused by pressure being applied to thumb projection 52 in the directions indicated by arrows 86 would likewise translationally move core 84 along the longitudinal axis 88.

The side view of stationary member 56, having slider block 44 integrated thereto, is shown in FIG. 4B. Adder block 46 may be added to surface 44b of slider block 44, by countersunk screws 48 as shown in FIG. 3. The addition of adder block 46, of different thickness, to surface 44b of slider block 44 varies the measurement range of the head assembly. In other words, a thinner adder block may be added to surface 44b if a smaller gap opening is to be measured while a thicker adder block may be added if a wider gap opening is to be measured.

At the other end of stationary extender member 56 there is a substantially circular section 56b, which is threaded, though not shown as such for sake of clarity. Within section 56b there is a bearing 90, preferably made of bronze, and into which slider cylinder 78 of movable extender rod member 50 is to be slidably fitted. Section 56b is to be threadedly mated to handle 54, at end 92 thereof. See FIG. 5a.

Figure 4C:
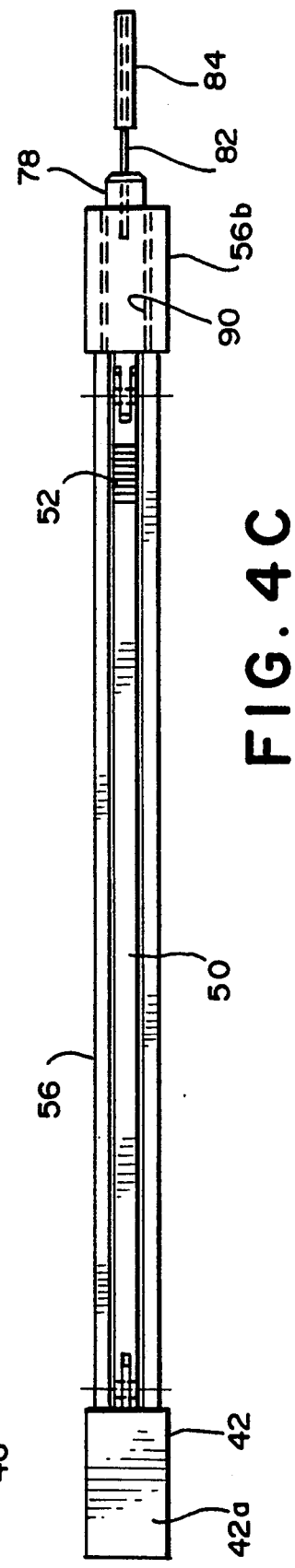
FIG. 4C is a plan view of the mating of the FIG. 4A member to the FIG. 4B member.

FIG. 4C is a plan view that illustrates the mating of movable extender rod member 50 to stationary extender member 56.

As was mentioned, portion 56b of stationary extender member 56 is threadedly mated to handle 54 at openings 92. As more clearly shown in the cross-sectional view of FIG. 5A, handle 54 has a cavity 92 inside of which LVDT 58 is fitted and pressed against shoulder 94 by a spring 96. Wires 38a provide electrical connection from cable 38 to LVDT 58. The rear end of handle 54 is sealed by a nylon plug 98, shown in FIG. 5c, which can be tightened by a screwed through thread-way 100.

LVDT 58 has an aperture 102 through which core 84 traverses. For this embodiment, LVDT 58 is a standard direct current input to direct current (DC-DC) output, readily available from several manufacturers, such as the Trans-Tek Company of Connecticut. An AC-AC LVDT could also be used. Essentially, by the movement of core 84 along the length of LVDT 58, an EMF voltage is generated and fed through wires 38a to cable 38, and thus to the electronics in container 40.

Figure 7:
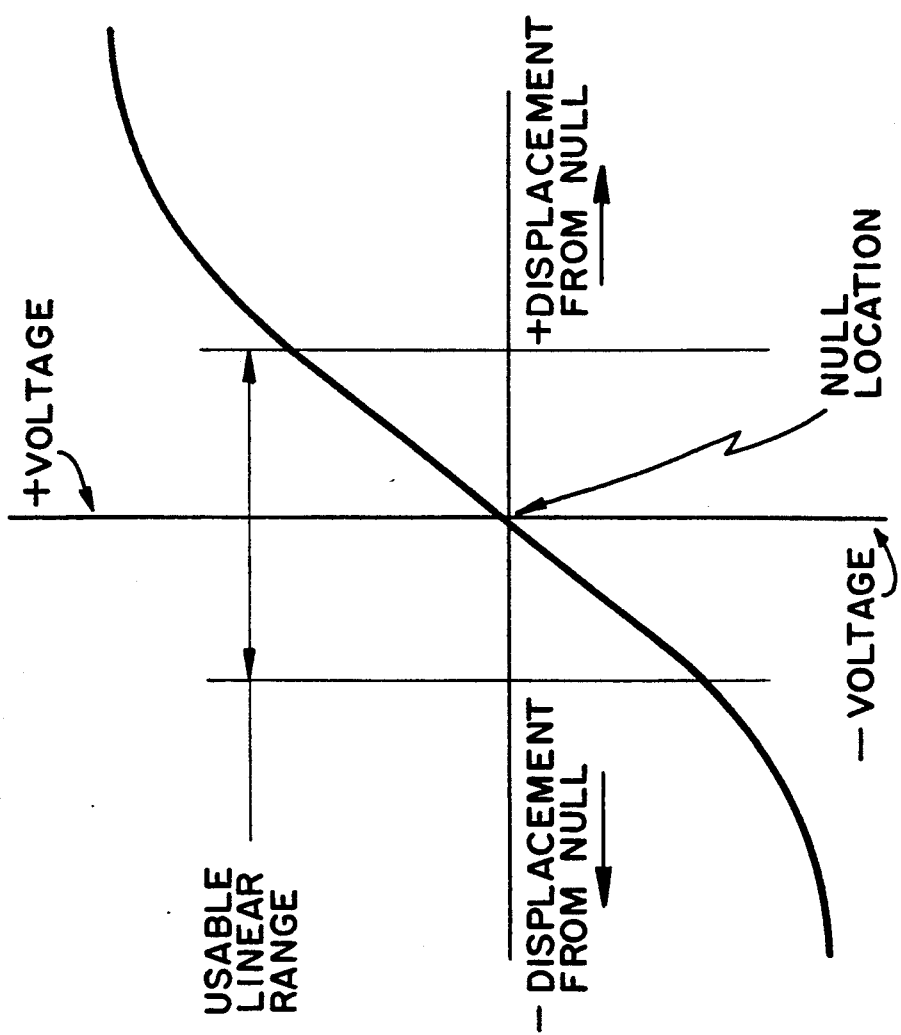
FIG. 7 is a graph showing the voltage to core displacement relationship from the linear variable differential transformer.

A graph of the voltage generated as a result of the core displacement in aperture 102 is shown in FIG. 7. There, it can be seen that the range of the LVDT is such that movement of the core within aperture 102 can result in both corresponding positive and negative voltages. To provide calibration of the LVDT, either to zero the instrument or calibrate a setting, after loosening screws 60 (FIG. 3), handle 54 is turned. After the calibrated setting or zero has been established, the position of handle 54 is locked into place by threading screw 60 to holes 104, as shown in FIGS. 5A and 5B. Calibration standards such as gauge blocks, micrometers, etc. could be used to calibrate the measuring parallels.

Figure 6A:
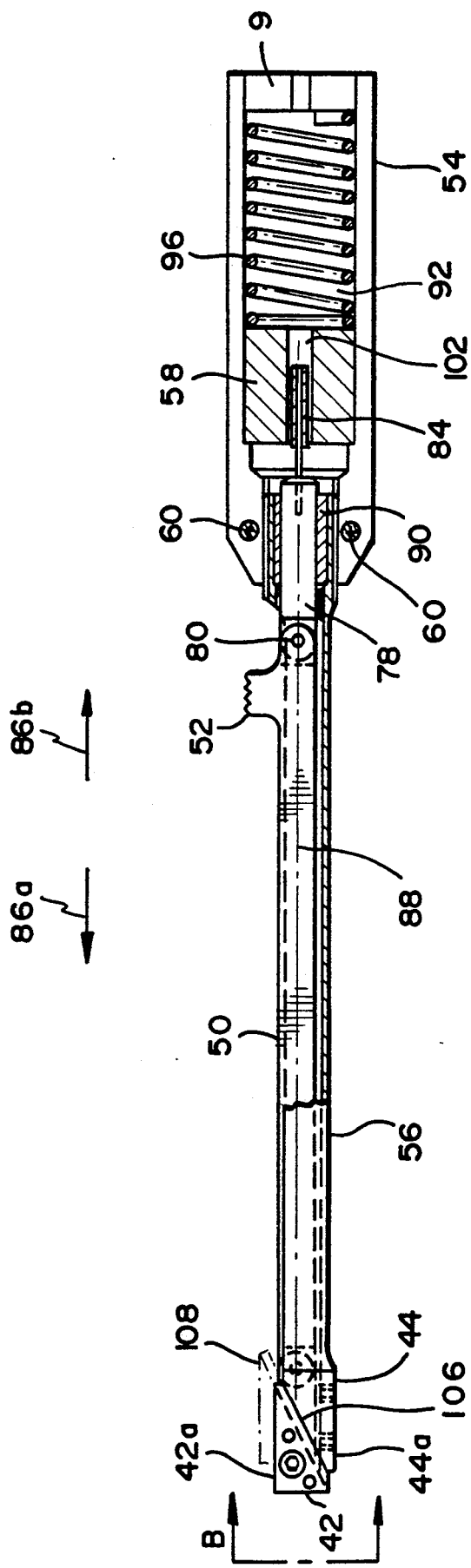
FIG. 6A is a semi-exposed cross-sectional view of the present invention instrument with its different components assembled.

FIG. 6A is a semi-cross-sectional side view of the present invention measurement instrument with the extender members and slider blocks having been properly coupled. As shown, stationary extender member 56 is threadedly mated to handle 54 such that slider cylinder 78 of movable extender rod member 50 is slidably inserted through bearing 90. As a consequence, core 84 is inserted within aperture 102 of LVDT 58. Also, upper slider block 42 is mated with lower slider block 44 at a transversal incline 106 such that were thumb projection 52 pushed in the direction indicated by arrow 86b, a relative movement between upper slider block 42 and lower slider block 44 along a direction orthogonal to parallel surfaces 42a and 44a, and therefore also orthogonal to longitudinal axis 88, is effected as shown by the dashed lines at position 108. The relative movement between upper slider block 42 and lower slider block 44 is due to the fact that, as movable extender rod member 50 is moved longitudinally, upper slider block 42 is forced against lower slider block 44, along transversal incline 106. Thus, a translational force along longitudinal axis 88 is converted to a directional movement orthogonal thereto.

Consequently, by inserting head assembly comprising upper and lower slider blocks 42 and 44 between two surfaces of a gap opening, by moving thumb projection 52 in the direction shown in 86b, the parallel surfaces 42a and 44a become contiguous, or come into contact, with the respective surfaces of the gap opening that is being measured. The distance of the gap opening is therefore effectively measured, as the movement of movable extender rod member 50 is translated to ferromagnetic core 84, whose movement within aperture 102 of LVDT is converted into a voltage signal such as that shown in FIG. 7.

Figure 6B:
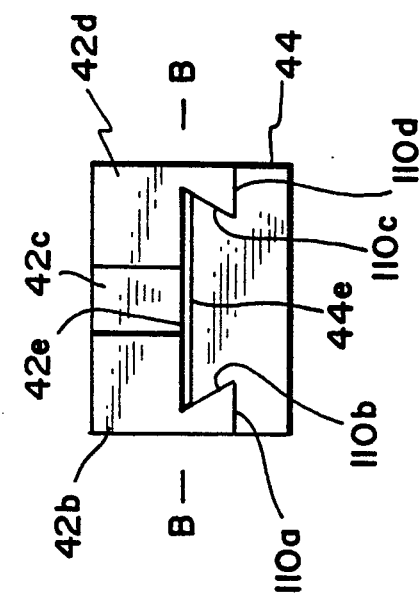
FIG. 6B is an end view along cut B—B of the head assembly of the FIG. 6A instrument.

As more clearly shown in the enlarged FIG. 6B end view of B—B, upper slider block 42 is mated to lower slider block 44 in a dovetail construction. As shown, the slider blocks are in contact with each other at surfaces 110a to 110d, with a gap being provided between surfaces 42e and 44e which allows for easy movement of the slider block relative to each other. It should be appreciated that though a dovetail construction is illustrated herein, the present invention is not being limited to such, as other constructions which provide for the simple relative movement of the slider blocks in a direction orthogonal to their parallel surfaces may also be used.

An alternative embodiment of the present invention instrument is shown in FIG. 9 where movable extending member 50 is shown to be separated into two portions 50a and 50b. Stationary extender member 56 likewise is separated into two sections 56a and 56b, which are connected at right angle to each other. Movable extender portion 50a is connected to movable extension portion 50b by a bell crank 112 such that head assembly 32 may be inserted into a gap opening, or a bore, that is at right angle to longitudinal axis 88. The relative movements between slider blocks 42 and 44 along the directions designated by directional arrows 111 is of course dependent, for this embodiment, on the movement of movable extender portion 50a along the directions designated by directional arrows 113, as bell crank 112 translates the directional movement of portion 50a, along 113, to a movement designated by directional arrows 115 by pivoting around pin 140. It should be appreciated that the FIG. 9 embodiment has been drawn simplistically so that the bell crank can be shown in greater detail.

To measure the inside diameter of a hole or bore, with reference to FIG. 10, head assembly 32 can be modified by adding protrusions 112a and 112b to upper slider block 42 and lower slider block 44, respectively. The protrusions may be respectively added to parallel surfaces 42a and 44a by a number of methods, such as by threading. The measuring of the inside diameter of a bore is effectively done by the tip of the protrusions coming into contact with opposed surfaces along the inner circumference of the bore.

Figure 8:
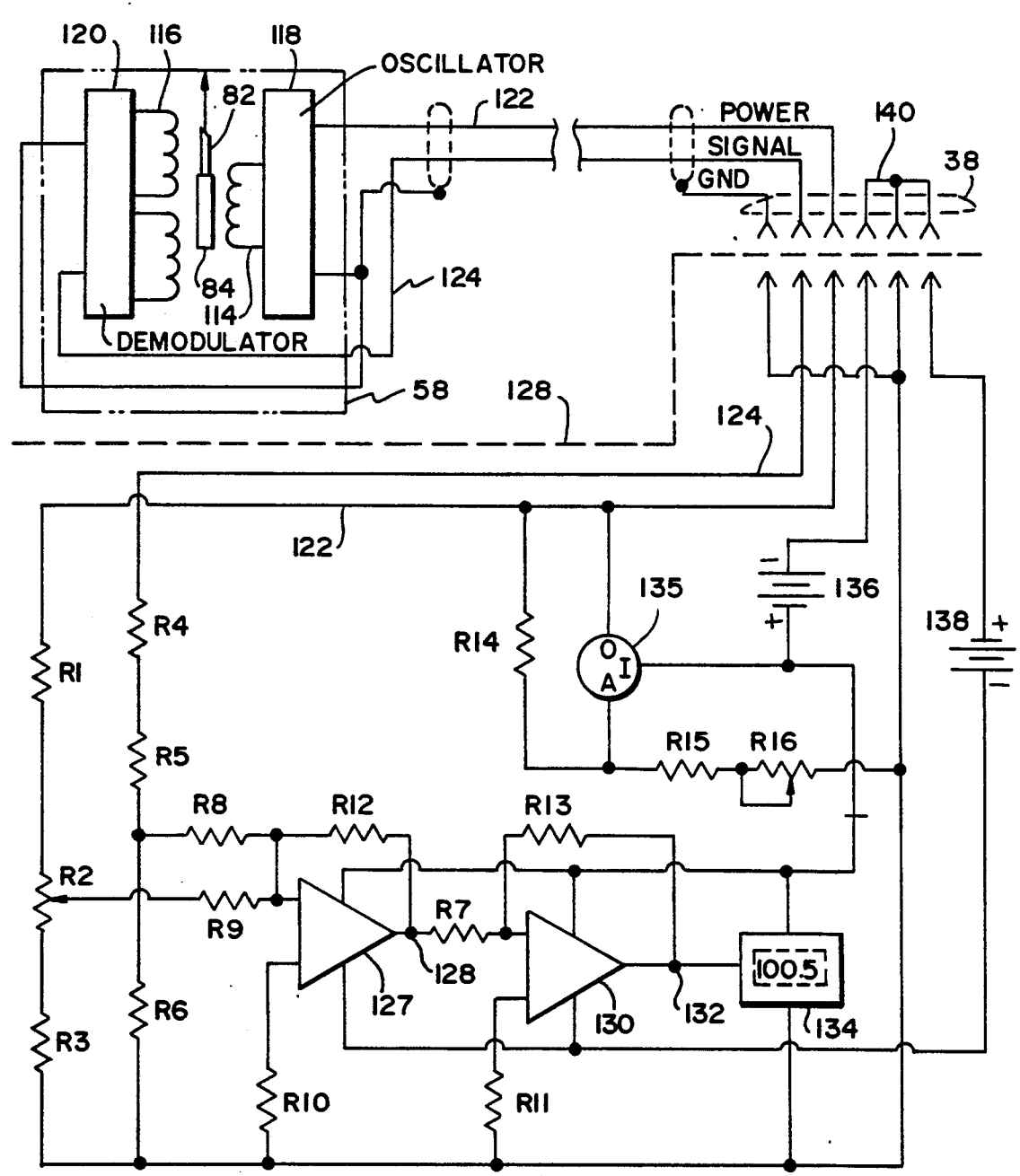
FIG. 8 is a schematic of the circuitry which provides the reading of measurements effected by the present invention instrument.

With reference to FIG. 8, the conversion of the translational movement along longitudinal axis 88 to a signal indicative of the distance measured by the parallel surfaces of slider blocks 42 and 44 is described. As shown, inside LVDT 58 are excitation winding 114 and induction windings 116. Excitation winding 114 is connected to an oscillator 118 and is powered thereby by an excitation frequency which, for this embodiment, is approximately 15 KHZ. The induction windings 116 are connected to a demodulator 120. Oscillator 118 is supplied with a DC voltage, via power line 122.

As core 84 is moved relative to the windings, an electromagnetic force EMF is induced into windings 116 and demodulated and then transmitted via signal line 124 of cable 38. The induced EMF signal is converted to a voltage such as that shown in FIG. 7. Cable 38 is fed to container 40 (FIG. 3) by a plug 126. The components residing in container 40 are delineated by dash line 128.

For a given measurement, as core 84 is displaced at a certain distance within aperture 102 such that it is displaced at a certain location relative to windings 114 and 116, an AC signal due to the core induced EMF is received and converted by demodulator 120 to a DC signal, which is fed via line 124 to a voltage divider network comprising resistors R4, R5 and R6. The voltage divider network properly scales the input signal and feeds it to an operational amplifier 127, acting as an adder. To provide proper offset of the output signal from the LVDT 58 so that the voltages generated thereby are all of the same polarity, an offset circuit comprising R1, R2 and R3 is used. The adjustment of this offset circuit is effected by resistor R2, which is a potentiometer. The output of the offset circuit from resistor R2 is summed with the output of the LVDT 58. The signal provided at output 128 of adder 126 is an inverted signal and is fed across biasing resistor R7 to operational amplifier 130, which acts as an inverter. The output signal provided at 132 is now a properly offset DC signal that can be provided as a direct input to a DC meter, such as 134, for display. As is well known, resistors R8, R9, R10 and R11 are biasing resistors while resistors R12 and R13 are feedback resistors for adder 127 and inverter 130, respectively.

A voltage regulator 134 in the circuit provides a regulated DC voltage for the offset adjust to prevent drift and also to oscillator 118 via line 122, which is required in order to scale the output signal of LVDT 58. Resistors R14, R15 and variable resistor R16 are in series resistors that accurately set the voltage level at the output of the voltage regulator, at input A of voltage regulator 135.

Voltages are provided to the circuit by DC sources 136 and 138, which for the embodiment, may be 9 volt batteries. As shown, voltage source 136 provides the positive voltage while voltage 138 provides the negative voltage. At cable 38, specifically at plug 126, three of the pins, designated 140 are used as a disable jumper to insure that current is not drawn from the voltage sources when plug 126 is disconnected from container 40.

Although the means for converting the signal generated by the LVDT is discussed herein with reference to FIG. 8 as comprising an electronic circuit, it should be appreciated that mechanical means may also be used, so long as the DC signal coming out from the demodulator 120 is converted to a readable indication that is representative of the relative movement of the parallel surfaces of the slider blocks. Also should be appreciated is that the output from inverter 130, instead of being fed to DC meter 134 as shown in FIG. 8, may be fed to other reading means, or a computer for further processing.

Another embodiment of the present invention is shown in FIG. 11 which, instead of the electronics shown in FIG. 8, uses a MITUTOYO reader by the Mitutoyo Company. Components which are the same as those of the embodiment shown in FIGS. 3 or perform the same functions are labeled the same. As shown, an alignment extender member 56 is fixedly coupled to a handle 142 to provide alignment for the instrument. Integrated to member 56 is a lower slider block 44. Mated to slider block 44 is an upper slider block 42 which is connected to a movable extender member 50. Coupled to member 50 is a head assembly 144 which is slidably movable along alignment member 56 and to which the MITUTOYO electronic reader is attached. There is provided to the MITUTOYO reader an embedded scale 148, bolted to handle 142, which the reader slides over as movable extension 50 translates along alignment member 56. In essence, head assembly 144 comprises portions 144a 144b which slide along with member 50 along alignment member 56. The MITUTOYO electronic reader is bolted to section 144b such that it is slidable along scale 148 so that as member 50 is moved to effect relative movements between slider blocks 42 and 44, by directly looking at the MITUTOYO reader, readings can be obtained which correspond to the relative movements of the parallel surfaces of the slider blocks.

Figure 2:
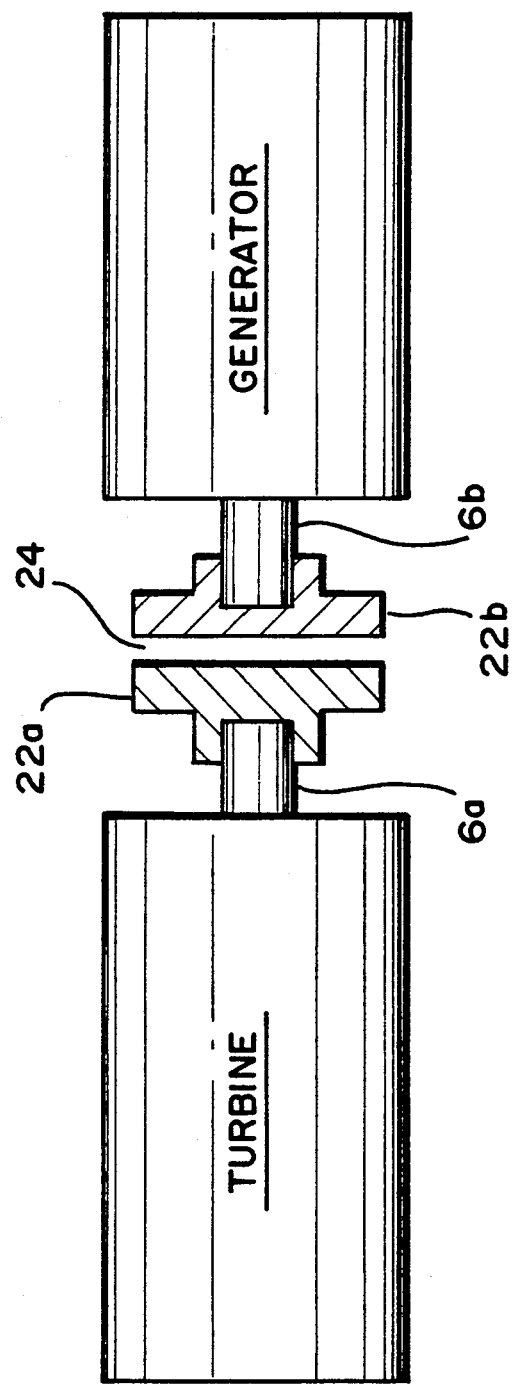
FIG. 2 is a simplified drawing of the gap between two couplings of a turbine and a generator which also provides a good example of where the present invention instrument can be adapted to be used.

Insofar as the present invention instrument has a head assembly comprising slider blocks, whose movements are easily and precisely controlled, and extender members connecting the head assembly to a remote reader, it should be appreciated that the present invention instrument is clearly adaptable to be used to measure the gaps and holes illustrated in FIGS. 1 and 2 which cannot be easily measured by prior art measuring tools.

Inasmuch as the present invention is subject to many variations, modifications and changes in detail, it is intended that all matter throughout this specification and shown in the accompanying drawings be interpreted as illustrative only and not in a limiting sense. Accordingly, it is intended that the invention be limited only by the spirit and scope of the appended claims.

What is claimed is:

1. Apparatus for measuring the distance between two opposing substantially flat surfaces, comprising:
   a head assembly including opposed parallel surfaces movable relative to each other along an incline;
   stationary extender means connected to one of said parallel surfaces and extending along a longitudinal axis;
   movable extender means connected to the other of said parallel surfaces and working cooperatively with said stationary extender means for moving said other parallel surface relative to said one parallel surface along said incline in a direction orthogonal to said parallel surfaces; and
   means coupled to said movable extender means for converting the movement thereof to an indication of the relative movement of said parallel surfaces to thereby measure the distance between said two substantially flat surfaces when said head assembly is inserted therebetween and said movable extender means is moved along the longitudinal axis to effectively position each of said parallel surfaces contiguous to a corresponding one of said two substantially flat surfaces.

2. Apparatus of claim 1, wherein said opposed parallel surfaces of said head assembly are movably and dovetailedly mated along said incline, said incline being a common transversal incline.

3. Apparatus of claim 1, further comprising a handle having a cavity in which said converting means is fitted.

4. Apparatus of claim 1, wherein:
said stationary extender means comprises a longitudinal member having a slot extending substantially along the entire length thereof; and
said movable extender means comprises another longitudinal member fitted to and slidably movable along said slot of said longitudinal member, said another longitudinal member having one end jointed to said other parallel surface and another end jointed to a core member slidably mated with said converting means such that the relative movement of said parallel surfaces is represented by the movement of said core member relative to said converting means.

5. Apparatus of claim 1, wherein said converting means comprises a linear variable differential transformer means including electrical windings; and
wherein said moveable extender means comprises a longitudinal rod having one end coupled to said other parallel surface and another end jointed to a ferromagnetic core movable along said electrical windings to effect a signal corresponding to the measured distance between said two surfaces.

6. Apparatus of claim 1, further comprising:
a housing having a cavity and an opening thereto;
wherein said stationary extender means comprises a longitudinal member having a slot extending substantially along the entire length thereof, said longitudinal member having a first end jointed to said one parallel surface and a second end threadedly mated to the opening of said housing;
wherein said movable extender means comprises a longitudinal rod fitted to and slidably movable along said slot of said longitudinal member, said longitudinal rod including a first end jointed to said other parallel surface and a second end jointed to a ferromagnetic core movably positioned beyond said longitudinal member in said cavity of said housing; and
wherein said converting means comprises a linear variable differential transformer means positioned within said cavity of said housing and having electrical windings to which said ferromagnetic core is electromagnetically mated for providing an electrical signal whose value is dependent on the relative placement of said ferromagnetic core to said electrical windings to thereby indicate the distance between said two substantially flat surfaces being measured by said parallel surfaces.

7. Apparatus of claim 1, wherein said stationary extender means comprises a first longitudinal member connected at right angle to a second longitudinal member, a slot being formed substantially along the entire length of said first and second longitudinal members;
wherein said movable extending means comprises a first longitudinal rod connected by a crank means at right angle to a second longitudinal rod, said first and second longitudinal rods slidably fitted within said first and second longitudinal members, respectively; and
wherein said opposed parallel surfaces are respectively connected to free ends of said first longitudinal member and rod and said converting means is coupled to the free end of said second longitudinal rod.

8. Apparatus of claim 1, further comprising:
a handle;
wherein said stationary extender means comprises an alignment member fixedly secured to said handle;
wherein said movable extender means comprises a longitudinal rod slidably movable along said alignment member; and
a housing having said converting means attached thereto fixedly attached to one portion of said longitudinal rod and movably mounted to said alignment member such that said housing and said converting means move in tandem when said longitudinal rod moves said other parallel surface relative to said one parallel surface to measure the distance between said two substantially flat surfaces.

9. Apparatus of claim 6, further comprising:
an electrical circuit including first circuit means for scaling said converted signal to obtain a proper offset signal; and
second circuit means for amplifying said offset signal to effect a readable signal.

10. Apparatus for measuring the size of the inside circumference of a bore, comprising:
a head assembly including respective protrusion secured to opposed parallel surfaces movable relative to each other along an incline;
stationary extender means connected to one of said parallel surfaces and extending along a longitudinal axis;
movable extender means connected to the other of said parallel surfaces and working cooperatively with said stationary extender means for moving said other parallel surface relative to said one parallel surface along said transversal incline in a direction orthogonal to said parallel surfaces; and
means coupled to said movable extender means for converting the movement thereof to an indication of the relative movement of said protrusions on said parallel surfaces to thereby measure the inside diameter of said bore when said head assembly is inserted into said bore and said movable extender means is moved along the longitudinal axis to effect said protrusions to make contact with opposed points on the inside circumference of said bore.

11. Apparatus of claim 10, wherein said opposed parallel surfaces of said head assembly are movably and dovetailedly mated along said incline, said incline being a common transversal incline.

12. Apparatus of claim 10, further comprising:
a housing having a cavity and an opening thereto wherein said stationary extender means comprises a longitudinal member having a slot extending substantially along the entire length thereof, said longitudinal member having a first end jointed to said one parallel surface and a second end threadedly mated to the opening of said housing;
wherein said movable extender means comprises a longitudinal rod fitted to and slidably movable along said slot of said longitudinal member, said longitudinal rod including a first end jointed to said other parallel surface and a second end jointed to a ferromagnetic core movably positioned beyond said longitudinal member in said cavity of said housing; and
wherein said converting means comprises a linear variable differential transformer means positioned within said cavity of said housing and having electrical windings to which said ferromagnetic core is electromagnetically mated for providing an electrical signal whose value is dependent on the relative placement of said ferromagnetic core to said electrical windings to thereby indicate the size of said bore being measured by said protrusions.

13. Apparatus of claim 10, wherein said stationary extender means comprises a first longitudinal member connected at right angle to a second longitudinal member, a slot being formed substantially along the entire length of said first and second longitudinal members;

wherein said movable extending means comprises a first longitudinal rod connected by a crank means at right angle to a second longitudinal rod, said first and second longitudinal rods slidably fitted within said first and second longitudinal members, respectively; and wherein said opposed parallel surfaces are respectively connected to free ends of said first longitudinal member and rod and said converting means is coupled to the free end of said second longitudinal rod.

14. Apparatus of claim 10, further comprising:
a handle;
wherein said stationary extender means comprises an alignment member fixedly secured to said handle;
wherein said movable extender means comprises a longitudinal rod slidably movable along said alignment member; and,
a housing having said converting means attached thereto fixedly attached to one portion of said longitudinal rod and movably mounted to said alignment member such that said housing and said converting means move in tandem when said longitudinal rod moves said other parallel surface relative to said one parallel surface to measure the distance between said two surfaces.

15. Apparatus of claim 12, further comprising:
an electrical circuit including first circuit means for scaling said converted signal to obtain a proper offset signal; and
second circuit means for amplifying said offset signal to effect a readable signal.

16. A method of measuring the distance between two surfaces, comprising the steps of:
inserting a head assembly having opposed parallel surfaces movable relative to each other along an incline between said two surfaces;
connecting one of said parallel surfaces to a stationary extender means extending along a longitudinal axis;
connecting the other of said parallel surfaces to a movable extender means working cooperatively with said stationary extender means;
moving said moveable extender means along the longitudinal axis to effectively move said other parallel surface relative to said one parallel surface along said incline in a direction orthogonal to said parallel surfaces until each of said parallel surfaces is contiguous to a corresponding one of said two surfaces; and
converting the relative movement of said parallel surfaces to an indication of the distance between said two surfaces.

17. Method of claim 16, wherein said converting step further comprises using a linear variable differential transformer means for converting the relative movement of said parallel surfaces to a first signal; further comprising the steps of scaling said first signal, and amplifying said scaled signal.

18. Method of claim 16, wherein said two surfaces are opposed surfaces on the inside circumference of a bore; further comprising the step of securing respective protrusions to said opposed parallel surfaces.

* * * * *